US012762830B2

(12) United States Patent
Dong

(10) Patent No.: US 12,762,830 B2
(45) Date of Patent: Oct. 13, 2026

(54) METHOD FOR EFFECT GENERATION AND APPARATUS, COMPUTER DEVICE, AND STORAGE MEDIUM

(71) Applicant: Beijing Zitiao Network Technology Co., Ltd., Haidian District (CN)

(72) Inventor: Qi Dong, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 195 days.

(21) Appl. No.: 18/744,329

(22) Filed: Jun. 14, 2024

(65) Prior Publication Data

US 2024/0420397 A1 Dec. 19, 2024

(30) Foreign Application Priority Data

Jun. 14, 2023 (CN) ......................... 202310706064.2

(51) Int. Cl.

| | |
|---|---|
| ***G06T 11/60*** | (2026.01) |
| ***G06T 7/20*** | (2017.01) |
| ***G06T 13/00*** | (2011.01) |
| ***G06V 10/54*** | (2022.01) |
| ***G06V 10/75*** | (2022.01) |

(52) U.S. Cl.

CPC ................ *G06T 11/60* (2013.01); *G06T 7/20* (2013.01); *G06T 13/00* (2013.01); *G06V 10/54* (2022.01); *G06V 10/75* (2022.01); *G06T 2200/24* (2013.01); *G06T 2207/20092* (2013.01); *G06T 2207/30196* (2013.01); *G06T 2210/16* (2013.01)

(58) Field of Classification Search

CPC . G06T 11/60; G06T 7/20; G06T 13/00; G06T 2200/24; G06T 2207/20092; G06T 2207/30196; G06T 2210/16; G06V 10/54; G06V 10/75

See application file for complete search history.

(56) References Cited

U.S. PATENT DOCUMENTS

2014/0205195 A1* 7/2014 Schonfeld ............ G06T 19/006 382/209
2019/0180479 A1* 6/2019 Tokuchi .................. G06F 3/016
2019/0197134 A1* 6/2019 Reyes Martinez . G06F 16/5866

* cited by examiner

*Primary Examiner* — Said Broome
*Assistant Examiner* — Andrew Shin
(74) *Attorney, Agent, or Firm* — Alleman Hall LLP

(57) ABSTRACT

A method and apparatus for effect generation, a computer device, and a storage medium are provided. The effect generation method can include: obtaining, in response to a trigger operation of a current target object for an effect, at least one feature data corresponding to the current target object based on the trigger operation; determining a target feature data of the current target object based on the at least one feature data; determining a target effect corresponding to the target feature data based on a matching relationship between the target feature data and effects; and attaching the target effect on a preset part of the target object according to a preset manner.

19 Claims, 4 Drawing Sheets

METHOD FOR EFFECT GENERATION AND APPARATUS, COMPUTER DEVICE, AND STORAGE MEDIUM

CROSS-REFERENCE TO RELATED APPLICATION(S)

This application claims priority to Chinese Application No. 202310706064.2 filed on Jun. 14, 2023, the disclosure of which is incorporated herein by reference in its entirety.

FIELD

The present disclosure relates to the technical field of effect generation, and specifically relates to a method for effect generation and apparatus, a computer device, and a storage medium.

BACKGROUND

With the development of effect technology, effect tools in various applications have emerged. At present, most of effect tools in various applications often have a limited number of built-in textures in an effect tool package to achieve effects with multi-texture switching. However, for different users, the generation of effects is same, making it difficult to provide the users with rich effect use experience.

SUMMARY

In view of this, the present disclosure provides a method and apparatus for effect generation, a computer device, and a storage medium, so as to solve the problem of poor effect use experience.

In a first aspect, the present disclosure provides an effect generation method, including: obtaining, in response to a trigger operation of a current target object for an effect, at least one feature data corresponding to the current target object based on the trigger operation; determining a target feature data of the current target object based on the at least one feature data; determining a target effect corresponding to the target feature data based on a matching relationship between the target feature data and effects; and attaching the target effect on a preset part of the target object according to a preset manner.

According to the effect generation method provided by this embodiment of the present disclosure, the different target objects correspond to the different target feature data. By detecting the target feature data of the current target object, the corresponding target effect is determined in conjunction with the matching relationship between the target feature data and the effects, and the target effect is attached on the preset part of the target object, thereby ensuring that the different target objects have different attached target effects, enriching the generation of the effects, diversifying the effects, and improving use experience of the effects.

In a second aspect, the present disclosure provides an effect generation apparatus. The apparatus includes: a trigger module for obtaining, in response to a trigger operation of a current target object for an effect, feature data corresponding to the current target object based on the trigger operation; a feature determining module for determining a target feature data of the current target object based on the at least one feature data; an effect determining module, configured to determine a target effect corresponding to the target feature data based on a matching relationship between the target feature data and effects; and a attaching module, configured to attach the target effect on a preset part of the target object according to a preset manner.

In a third aspect, the present disclosure provides a computer device, including a memory and a processor. The memory and the processor are in mutual communication connection. The memory stores computer instructions. The processor executes the computer instructions to perform the effect generation method in the first aspect or any one of the corresponding implementations.

In a fourth aspect, the present disclosure provides a computer-readable storage medium, having computer instructions stored therein. The computer instructions are configured to enable a computer to perform the effect generation method in the first aspect or any one of the corresponding implementations.

BRIEF DESCRIPTION OF THE DRAWINGS

In order to describe technical solutions in specific implementations of the present disclosure or the prior art more clearly, accompanying drawings required to be used in the descriptions of the specific implementations or the prior art will be simply introduced below, obviously, the accompanying drawings described below are some implementations of the present disclosure, and those of ordinary skill in the art can obtain other accompanying drawings according to these accompanying drawings without creative work.

DETAILED DESCRIPTION OF EMBODIMENTS

In order to have a clearer understanding of the objectives, technical solutions, and advantages of embodiments of the present disclosure, the technical solutions in the embodiments of the present disclosure are clearly and completely described in conjunction with the accompanying drawings in the embodiments of the present disclosure, and it is apparent that the described embodiments are only a part rather all of embodiments of the present disclosure. Based on the embodiments of the present disclosure, all other embodiments obtained by those skilled in the art without creative work shall fall within the scope of protection of the present disclosure.

Currently, effect tools in various applications in the related art often have a limited number of built-in textures in an effect tool package to achieve effects with multi-texture switching. However, for different users, the generation of effects is same, resulting in relatively monotonous and not diverse enough effects, which makes it difficult to provide the users with rich effect use experience.

Based on this, in the technical solution of the present disclosure, a corresponding target effect is determined by obtaining target feature data of a current target object, and the target effect is attached on the target object. Different target objects correspond to different target feature data, and therefore generated effects are different, thereby enriching the use experience of effects.

According to embodiments of the present disclosure, an embodiment of a method for effect generation is provided. It should be noted that the steps shown in the flowcharts of the accompanying drawings may be performed in a computer system such as a set of computer executable instructions. In addition, although a logical sequence is shown in the flowchart, the illustrated or described steps may be performed in a different sequence than presented here in some cases.

Figure 1:
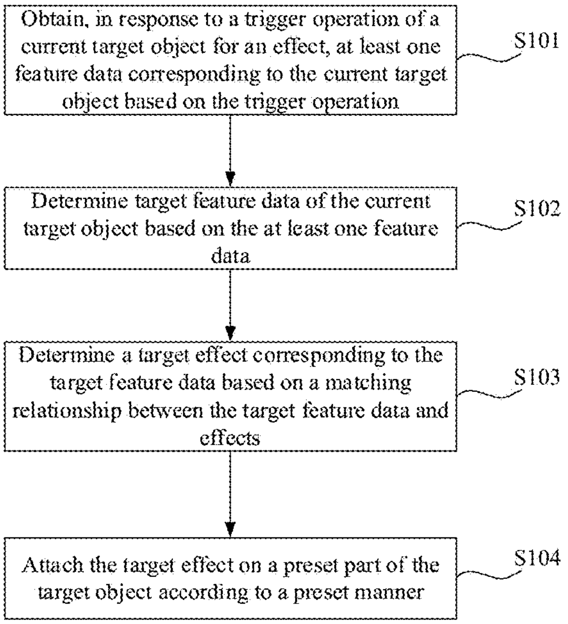
FIG. 1 is a schematic flowchart of a method for effect generation according to an embodiment of the present disclosure.

In this embodiment, a method for effect generation is provided and may be applied to the above computer device, such as a mobile phone, a tablet, and a computer. FIG. 1 is a flowchart of a method for effect generation according to an embodiment of the present disclosure. As shown in FIG. 1, the process includes the following steps:

Step S101: in response to a trigger operation of a current target object for an effect, at least one feature data corresponding to the current target object is obtained based on the trigger operation.

The target object refers to a user who triggers an application to generate an effect, and the application is installed in the computer device. An application icon is displayed on a display screen of the computer device. The target object may select the application icon through a touch screen, a keyboard, a mouse, or the like to start the application.

After the application is started, the target object may select an effect function on a display interface of the application, or send a specified gesture instruction to trigger the effect function, or give a specified action (e.g., taking a turn) to trigger the effect function. Correspondingly, the application in the computer device may enter an effect generation interface in response to the trigger operation of the current target object on the effect function.

The feature data is configured to represent a feature attribute corresponding to the target object, and different target objects have different feature attributes. The feature data specifically may include a body proportion, a clothing worn, a spatial environment, etc. When the application enters the effect generation interface, a camera of the computer device is triggered to be started and collects an image of the target object, thereby parsing one or more feature data corresponding to the target object from the image.

Step S102: target feature data of the current target object is determined based on the at least one feature data.

The target feature data is obtained by fusing the at least one feature data. Specifically, in response to there being one feature data, the feature data is a final target feature data; and in response to there being a plurality of feature data, weight fusion is performed on the plurality of feature data to obtain the final target feature data.

Step S103: a target effect corresponding to the target feature data is determined based on a matching relationship between target feature data and effects.

There is a matching relationship between effects and target feature data, meaning that different target feature data corresponds to different effects. Specifically, the matching relationship is pre-constructed by technical personnel, and is stored in the computer device or cloud. Effects of different styles are stored in an effect set. The effect set may be stored in the cloud to overcome the volume limitation of an effect tool package, thereby facilitating the request and acquisition of rich effect resources from a cloud server in an effect generation process.

In a specific implementation, the computer device may generate an effect request message based on the obtained target feature data, and send the request message to the cloud server. Correspondingly, after receiving the request message, the cloud server selects the corresponding target effect from the effect set in conjunction with the target feature data carried by the request message based on the matching relationship between the target feature data and the effects, and sends the target effect to the computer device. The computer device may receive the target effect issued by the cloud server.

Step S104: the target effect is attached on a preset part of the target object according to a preset manner.

The preset manner is a preset dynamic gradual appearance method of the effect. The preset part is a preset effect attaching position. By obtaining a body silhouette of the target object, the preset part that needs to be attached is extracted from the body silhouette, and the target effect is occluded, that is, a front surface of the preset part of the target object is occluded, and a back surface is not occluded. Therefore, the target effect is attached on the preset part of the target object.

Specifically, input information of the camera on the computer device is recognized through computer vision and an artificial intelligence algorithm to obtain body joint point positions and a rotation matrix of the target object, and a portrait and a background area are separated to output a mask of a portrait area and front and back information of the character. Then, a spatial position of the effect tool is set according to the body joint point positions and the rotation matrix, and an occlusion relationship between the effect tool and the character is set according to the mask of the portrait area and the front and back information of the character. Specifically, occlusion is required only in response to the character directly facing a camera lens of the computer device. Therefore, the target effect can be attached on the target object. During being attached, the target effect is dynamically presented according to a preset manner, thereby achieving the dynamic gradual appearance effect of the target effect.

According to the effect generation method provided by this embodiment, the different target objects correspond to the different target feature data. By detecting the target feature data of the current target object, the corresponding target effect is determined in conjunction with the matching relationship between the target feature data and the effects, and the target effect is attached on the preset part of the target object, thereby ensuring that the different target objects have different attached target effects, enriching the generation of the effects, diversifying the effects, and improving use experience of the effects.

Figure 2:
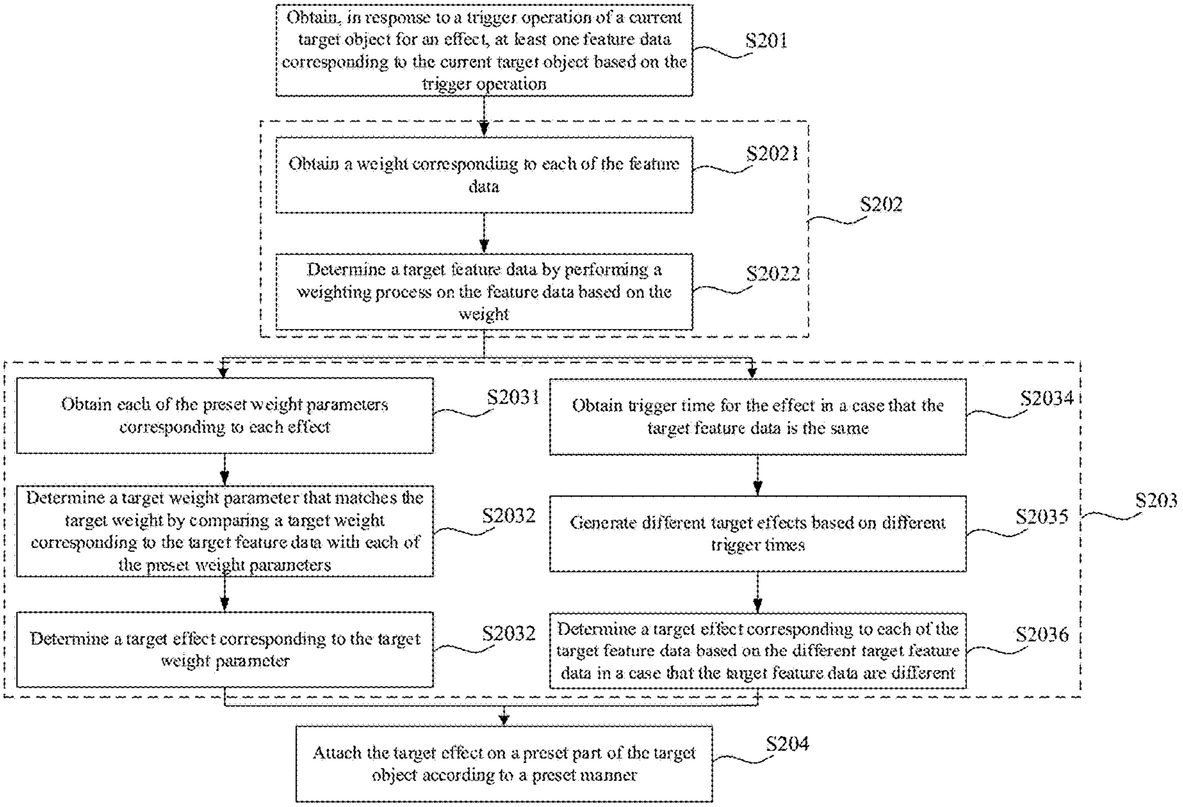
FIG. 2 is a schematic flowchart of another method for effect generation according to an embodiment of the present disclosure.

In this embodiment, a method for effect generation is provided and may be applied to the above computer device, such as a mobile phone, a tablet, and a computer. FIG. 2 is a flowchart of a method for effect generation according to an embodiment of the present disclosure. As shown in FIG. 2, the process includes the following steps:

Step S201: in response to a trigger operation of a current target object for an effect, at least one feature data corresponding to the current target object is obtained based on the trigger operation. For detailed descriptions, reference is made to relevant descriptions of the corresponding steps in the above embodiments, which are not repeated here.

Step S202: a target feature data of the current target object is determined based on the at least one feature data.

Specifically, step S202 may include:

S2021: a weight corresponding to each feature data is obtained.

The weight represents a degree of contribution of each of the feature data to determining the target feature data. The weight is preset by technical personnel based on actual needs. A corresponding relationship between the weight and the feature data may be stored in a storage space of the computer device. Specifically, after obtaining image data specific to the current target object, one or more feature data possessed by the current target object is parsed from the image data. By accessing the corresponding relationship between the feature data and the weight, the weight for each feature data may be obtained in conjunction with the corresponding relationship.

S2022: weighting process is performed on the feature data based on the weight to determine target feature data.

In response to there being one feature data, the weight corresponding to the feature data is 1, and the target feature data may be represented by the feature data. In response to there being a plurality of feature data, each of the feature data is subjected to weighting process according to the corresponding weight, thereby generating a target feature data. Specifically, if the plurality of feature data respectively includes a clothing texture, illumination data, and a body proportion, with corresponding parameter values of A, B, and C, and corresponding weights of a, b, and c, the weighted value of each feature data may be obtained as $A\times a+B\times b+C\times c$, and the weighted value represents the target feature data.

According to the method for effect generation provided by this embodiment, the target feature data is determined in conjunction with the weight of each feature data, and then the corresponding target effect is determined in conjunction with the target feature data, thereby determining the corresponding the target effects in conjunction with the plurality of feature data, ensuring that the different target objects can be matched with the corresponding target effects, and diversifying the generation of the target effects.

Step S203: a target effect corresponding to the target feature data is determined based on the matching relationship between the target feature data and the effects.

Specifically, in response to there being a plurality of feature data, step S203 may include:

S2031: a preset weight parameter corresponding to each effect is obtained.

The preset weight parameter may be a weight parameter preset for each effect. The preset weight parameter may be a fixed value or a range. Each effect has a corresponding preset weight parameter, and the preset weight parameter and the effect are stored in the effect set.

Step S2032: the target weight parameter that matches the target weight is determined by comparing a target weight corresponding to the target feature data with each of preset weight parameters.

The target weight is a weight that represents the target feature data. By comparing the target weight with the preset weight parameter of each effect, the matched target weight parameter is determined from the plurality of preset weight parameters.

Specifically, in response to the preset weight parameter being a fixed value, if the target weight is consistent with the fixed value, it indicates that the target weight matches the preset weight parameter. In response to the preset weight parameter being a range, if the target weight falls within the range, it indicates that the target weight matches the preset weight parameter.

Step S2033: a target effect corresponding to the target weight parameter is determined.

After determining the target weight parameter from the plurality of preset weight parameters, the target effect corresponding to the target weight parameter may be determined in conjunction with a matching relationship between preset weight parameters and effects.

Here, in response to there being a plurality of feature data, the target effects specific to the different target weight parameters can be determined in conjunction with the matching relationship between weight parameters and effects, thereby generating different effects for different target objects, and ensuring richness of the target effects to the maximum degree.

In some optional implementations, step S203 may further include:

Step A: a difference value between the target weight and each preset weight parameter is determined in response to there being no target weight parameter matching the target weight.

After comparing the target weight with the preset weight parameter of each effect and determining that there is no target weight parameter matching the target weight among the plurality of preset weight parameters, the difference value between the target weight and each preset weight parameter is further calculated.

Step B: the preset weight parameter having the smallest difference value with the target weight is determined as a target weight parameter, and a target effect corresponding to the target weight parameter is determined.

By sorting the various difference values, the smallest difference value is determined from the plurality of difference values. The preset weight parameter corresponding to the smallest difference value is the target weight parameter corresponding to the current target weight. Then, the target effect corresponding to the target weight parameter is determined in conjunction with the matching relationship between preset weight parameters and effects.

Here, by detecting the difference values between the target weight and the preset weight parameters, the target effect that matches the target weight is determined to the maximum degree, thereby further ensuring fit between the target effect and the target object.

Specifically, in response to there being one feature data, step S203 may include:

Step S2034: trigger times for the effects are obtained in response to target feature data being the same.

In response to different target objects triggering the effect function of the application, whether feature data of the different target objects are the same is detected. In response to the feature data corresponding to the different target objects being the same, trigger times of the different target objects for the effect are obtained.

Specifically, there is a sequence of trigger times for the application to receive the effect trigger operation, that is, the application cannot receive different effect generation requests at the same time. Each target object has a corresponding unique identification, that is, different target objects have different identification information. In response to feature data corresponding to the different target objects being the same, in this case, the application may detect the trigger times about the effects from the different target objects. For example, if the feature data is an illumination data, the target feature data is represented by the illumination data, and therefore in response to the different target objects triggering effect generation in a space with the same illumination data, the application may obtain the trigger time for the effect from the different target objects.

In some optional implementations, the application may also determine whether the effect generation is triggered by different target objects based on different identification information. If the target object with the same identification information continuously triggers the effect generation, the application may detect an interval between the two trigger times. In response to the interval being less than a preset value, it may be considered that the target object performs a false trigger. In response to the interval being greater than the preset value, it indicates that the target object triggers the effect generation again. In this case, the application may obtain a target effect different from the previous effect from the effect set, thereby further enhancing use experience of the target object for the effect.

Step S2035: different target effects are generated based on different trigger times.

For the adjacent trigger times, the application may obtain the different target effects from the effect set. That is, for the adjacent trigger times, in response to the target feature data being the same, the obtained target effects are different, thereby achieving a diverse effect of the effects to the maximum degree.

In some optional implementations, if there are two or more target objects in the effect generation interface, the application may obtain different target effects for the different target objects.

Step S2036: In response to the target feature data being different, a target effect corresponding to each target feature data is determined based on the different target feature data.

In response to the target feature data is different, different target effects may be generated based on the different target feature data in conjunction with the matching relationship between the target feature data and the effects.

According to the effect generation method provided by this embodiment, in response to detecting that the target feature data corresponding to the different target objects being the same, different target effects are obtained by detecting the trigger time of the different target objects for the effects, thereby ensuring different target effects displayed at the adjacent trigger times, and ensuring generation diversity of the target effects to the maximum degree.

In some optional implementations, in response to the feature data being illumination data, step S203 may specifically include:

Step a1: illumination data of a current spatial environment where the target object is located is collected, where different illumination data corresponds to different effects.

Step a2: a target effect corresponding to the illumination data is obtained according to a matching relationship between illumination data and effects.

The camera arranged on the computer device may collect the target object and an image of the current spatial environment. Illumination data in the image is extracted through an image processing algorithm, and the illumination data is the illumination data of the current spatial environment. Different illumination data corresponds to different target effects. The application filters the effect that matches the illumination data from the effect set based on the illumination data of the current spatial environment where the target object is located.

In some optional implementations, if there is only one effect tool in the effect set that matches the current illumination data, the effect is determined as the target effect. If there are a plurality of effects in the effect set that match the current illumination data, one of the effects is randomly selected as the target effect. Of course, the target effect may also be determined from the plurality of effects in conjunction with other feature data of the target object to ensure attaching realism of the target effect.

Here, by analyzing the illumination data of the spatial environment where the target object is located, and selecting the matched target effect based on the illumination data, target effects attached on the same target object in different illumination environments are different, and target effects attached on different target objects in the different illumination environments are different as well, thereby providing the users with rich effect use experience.

In some optional implementations, in response to the feature data indicating texture features, step S203 may specifically include:

Step b1: an image of a clothing currently worn by the target object is collected, and texture features of the clothing image is analyzed.

Step b2: a target effect corresponding to the current texture features is obtained according to a matching relationship between texture features and effects.

The camera arranged on the computer device may collect the image of the target object, and the image of the clothing worn by the target object may be determined according to the image of the target object. Then, the clothing texture features in the clothing image can be analyzed, including color texture, pattern texture, etc. Since the effect set includes effects of a variety of texture styles, in order to ensure that the effect can fit the current clothing of the target object, the application may obtain the target effect that matches the current texture features from the effect set, thereby enhancing attaching fit and attaching realism between the target effect and the target object.

Here, by analyzing the texture features of the clothing image of the target object, the matched target effect is selected from the effect set based on the texture features, thereby ensuring that the target effects attached by differently dressed target objects are different, and improving effect use experience of the users.

In some optional implementations, in response to the feature data being object attribute data, step S203 may specifically include:

Step c1: an image of the target object is collected, and object attribute data of the target object is analyzed.

Step c2: effects of a plurality of styles corresponding to the object attribute data are obtained.

Step c3: the effect of one style from the effects of the plurality of styles is determined as a target effect tool.

The camera arranged on the computer device may collect the image of the target object, the object attribute data of the target object is analyzed according to the image of the target object, and the object attribute data includes body data, expression data, etc. The effects of the plurality of styles corresponding to the object attribute data are obtained from the effect set in conjunction with the object attribute data, and the effect of one style is randomly selected from the plurality of effects as the target effect.

Taking expression data as an example, different expressions correspond to different styles of effects. For example, the effect tool is a butterfly wing tool, in response to there being a smiling expression, spots are displayed on the butterfly wing tool attached on a preset part of the target object, and in response to there being an angry expression, no spots are displayed on the butterfly wing tool attached on the preset part of the target object. Similarly, the generation of effects may also be adaptively adjusted based on the body data of the target object.

Here, by analyzing the object attribute data, different styles of target effects correspond to different object attribute data, thereby ensuring that the target effects attached on the target object with different object attribute data are different. Since different object attribute data correspond to different requirements for effect display, compared with a single effect generation, generating different effects based on the object attribute data greatly satisfies the needs of the users for using the effects and enhancing the use experience of the users for the effects.

Step S204: the target effect is attached on a preset part of the target object according to a preset manner. For detailed descriptions, reference is made to relevant descriptions of the corresponding steps in the above embodiments, which are not repeated here.

According to the method for effect generation provided by this embodiment, by detecting the feature data corresponding to the target object, the different target effects are generated, thereby achieving diversity of the effects and enriching the effect generation.

Figure 3:
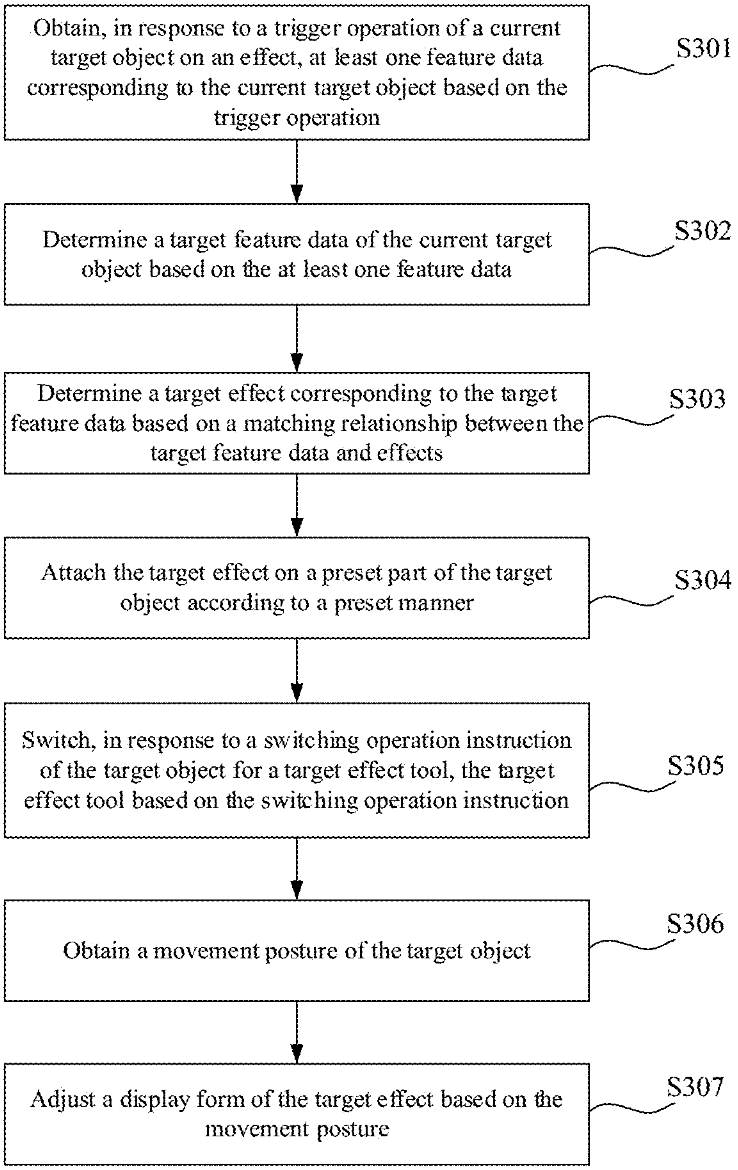
FIG. 3 is a schematic flowchart of yet another method for effect generation according to an embodiment of the present invention.

In this embodiment, a method for effect generation is provided and may be applied to the above computer device, such as a mobile phone, a tablet, and a computer. FIG. 3 is a flowchart of a method for effect generation according to an embodiment of the present disclosure. As shown in FIG. 3, the process includes the following steps:

Step S301: in response to a trigger operation of a current target object for an effect, at least one feature data corresponding to the current target object is obtained based on the trigger operation. For detailed descriptions, reference is made to relevant descriptions of the corresponding steps in the above embodiments, which are not repeated here.

Step S302: a target feature data of the current target object is determined based on the at least one feature data. For detailed descriptions, reference is made to relevant descriptions of the corresponding steps in the above embodiments, which are not repeated here.

Step S303: a target effect corresponding to the target feature data is determined based on a matching relationship between target feature data and effects. For detailed descriptions, reference is made to relevant descriptions of the corresponding steps in the above embodiments, which are not repeated here.

Step S304: the target effect is attached on a preset part of the target object according to a preset manner. For detailed descriptions, reference is made to relevant descriptions of the corresponding steps in the above embodiments, which are not repeated here.

Step S305: in response to a switching operation instruction of the target object for a target effect tool, the target effect tool is switched based on the switching operation instruction.

The switching operation instruction is a switching instruction sent by the target object for the target effect. Specifically, the switching instruction may be an outward palm, a left wave, a right wave, voice information, etc. In response to the target object sending the switching operation instruction for the target effect, the application may switch to target effects of other texture styles in response to the switching operation instruction of the target object.

Step S306: a movement posture of the target object is obtained.

The movement posture is used for representing a movement gesture and a movement direction of the target object, such as turning left and turning right. In response to the target effect being attached on the target object, if the target object moves, the movement posture of the target object may be captured by the camera.

Step S307: a display form of the target effect is adjusted based on the movement posture.

The display form is used for representing a display effect of the target effect attached on the target object, specifically including changes in lighting and shadow, form, etc. In response to the target object moving with the target effect attached, the target effect may be adaptively adjusted according to the movement of the target object to so as to adjust the display form.

According to the method for effect generation provided by this embodiment, the target object is supported to switch the target effect, facilitating flexible switching of the target effect to generate an effect display effect that meets user needs. In response to the target object moving with the target effect attached, the target effect can be dynamically adjusted according to the movement posture of the target object, making the target effect more suitable for the actual scenario and more realistic.

In some optional implementations, a method effect set generation includes:

Step d1: a creation page for a model patch is displayed, the creation page includes a plurality of model parameters.

Step d2: a model parameter combination set is obtained in response to an adjustment operation on one or more model parameters.

Step d3: programmable generation is performed based on the model parameter combination set to obtain an effect model set.

Step d4: an augmented virtual reality effect set is generated based on the effect model set.

The computer device is provided with a programmatically generated model creation tool. Technical personnel may develop a model plugin in the model creation tool, and model patch creation is performed through the model plugin. The creation page for the model patch is a display page for the model plugin. The creation page for the model patch includes a plurality of model parameters for adjusting the model patch, specifically including: a contour shape, color attributes (e.g., hue, brightness, and purity), grid attributes (e.g., a grid density and a grid shape), overlay element attributes (e.g., an element type, an element quantity, an element shape, an element color, and an element overlay position), a black edge range, a gradient attribute, a hue difference degree attribute, etc.

By adjusting a parameter value of any model parameter, a set of model parameter combinations can be obtained. Therefore, the computer device may obtain a plurality of sets of model parameter combinations in response to the adjustment operation of technical personnel on the parameter values corresponding to one or more model parameters, and the different model parameter combinations form the model parameter combination set.

The model creation tool is adopted to construct an effect model based on the model parameter combinations. Specifically, the model creation tool creates a basic shape of the model patch based on the parameters included in the model parameter combinations to synthesize texture of the model patch. The current texture is converted from Cartesian coordinates to polar coordinates to obtain new texture. The new texture is subjected to contour cropping in conjunction with the contour shape in the model parameter combinations to obtain a model contour. A preset processing algorithm is adopted to process the model contour to obtain the effect model. The preset processing algorithm includes an edge detection algorithm, a fuzzy algorithm, a flood fill algorithm, a color mapping algorithm, a tone mapping algorithm, a height to normal mapping algorithm, a texture overlay algorithm, etc.

By sequentially processing the various model parameter combinations in the model parameter combination set through the model creation tool, the effect model set formed by a plurality of effect models can be obtained.

A preset effect creation tool is a preset image editing tool. The computer device imports the generated effect model into the preset effect creation tool, and an augmented virtual reality effect tool is generated through the preset effect creation tool. By inputting the various effect models in the effect model set into the preset effect creation tool, corresponding effect sets can be generated in batch.

Figure 4:
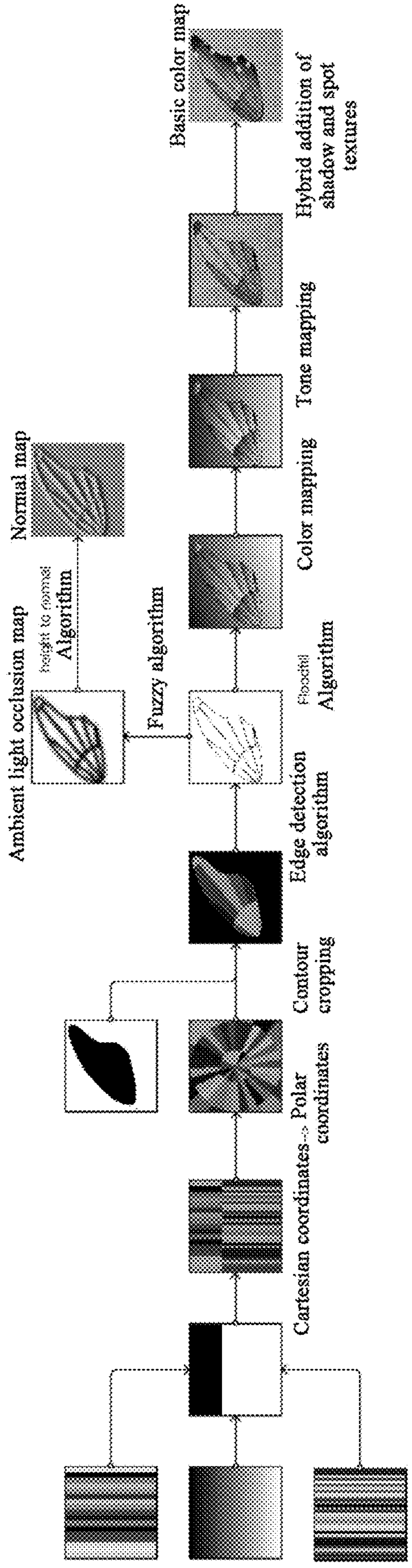
FIG. 4 is a schematic diagram of the generation of a wing effect tool according to an embodiment of the present disclosure.

Taking the butterfly wing tool as an example, as shown in FIG. 4, the process of generating the wing effect tool is described as follows:

1) a basic shape (i.e., square) of each wing patch is created through the creation page for the model patch, and various model parameters are set.
2) texture generation is performed on the basic shape to obtain strip texture of each wing patch.
3) the strip texture is converted from Cartesian coordinates to polar coordinates, thereby converting the strip texture into circular texture.
4) contour cropping is performed on the circular texture in conjunction with the contour shape corresponding to each wing patch, cropping of a wing contour is controlled through a transparency channel of basic color texture to obtain the wing contour, and in the contour cropping process, UV symmetric distribution of patches on a left side and a right side of the wing is guaranteed, such that the wing patches on the two sides may use the same material, thereby reducing a data size.
5) the wing contour is processed in conjunction with the edge detection algorithm and the fuzzy algorithm to generate an ambient light occlusion map corresponding to the wing contour, and the ambient light occlusion map is converted into a normal map in conjunction with a mapping algorithm.
6) the wing contour is processed in conjunction with the flood fill algorithm to obtain a filled wing contour, and color gradient mapping coloring and tone gradient mapping coloring are performed on the filled wing contour to generate a mapping map of the wing contour.
7) shadows, spot texture, etc. are added on the mapping map of the wing contour in conjunction with the texture overlay algorithm to obtain a color map of the wing.
8) a wing effect model is generated in conjunction with the color map and the normal map of the wing.
9) the wing effect model is inputted into the preset effect creation tool to generate a wing effect tool.

Here, by adjusting the various model parameters on the creation page for the model patch, the model parameter combination set is obtained, and therefore, for complex texture, the corresponding model parameter combination set can be obtained through flexible adjustment of the model parameters. Therefore, diverse effect models can be generated in conjunction with a programmable generation method, thereby obtaining the effect model set. Accordingly, the augmented virtual reality effect set can be generated through the effect creation tool. Therefore, batched generation of the effects is achieved.

In some optional implementations, the above effect set generation method may further include: corresponding animation data is added to each effect in the effect set, and a dynamic appearance method of the effect is controlled based on the animation data.

The animation data represents a preset gradual transition animation for the model, and the gradual appearance of the effect is controlled through the animation data. Taking the wing effect as an example, a vertex color attribute of the wing effect model corresponding to the wing effect gradually transitions from a wing root to a wing tip, thereby achieving control over a wing dissolution direction.

Specifically, a corresponding vertex color attribute value is calculated in conjunction with changes in the vertex color attribute from the wing root to the wing tip. The range of the vertex color attribute value is [0, 1], where the vertex color attribute value corresponding to the wing root is 1, and the vertex color attribute value corresponding to the wing tip is 0. Based on spatial coordinates of the wing effect model corresponding to the wing effect tool, noise texture sampling is performed, and noise texture is superimposed on noise of the wing effect model. The superimposed noise value is compared with a dissolution value (the dissolution value gradually changes from 1 to 0 over time) to determine whether to display a current pixel. Therefore, the gradual appearance/fading of the wing effect tool is achieved.

Here, the dissolution gradual appearance/fading of the wing is achieved based on the direction of the vertex color attribute, and the noise is added to the wing effect model to increase randomness at a wing edge, thereby achieving an effect of the butterfly wing gradually appearing from the wing root to the wing tip. By adding the animation data to the effect, dynamic display of the effect can be performed based on the animation data, thereby enhancing generation flexibility of the effect, and improving entertainment experience of the user.

In some optional implementations, the above effect set generation method may further include:

Step e1: material texture of the effect is updated in response to a material adjustment instruction for the effect tool.

Step e2: the effect with the updated material texture is stored in the effect tool set.

Technical personnel may select a material of interest from a material library to perform material adjustment, thereby updating the material texture of the effect. Correspondingly, the computer device may update the material texture of the effect in response to the material adjustment instruction of technical personnel for the effect, thereby obtaining a effect with the new material texture. Further, the computer device may store the effect with the updated material texture into the effect set.

After being obtained, the effect set is packaged and compressed, and then uploaded to the cloud server for cloud storage, thereby breaking through the volume limitation of the effect tool package. In response to an effect file loaded in the effect tool package being deleted, it is necessary to delete the texture file step by step, or otherwise, the effect may fail in loading again.

The above method supports the material adjustment operation on the effect, thereby achieving flexible adjustment of the material texture for the effect. Meanwhile, the effect with the updated material texture is stored into the effect set, thereby enriching effect styles, and ensuring that the target object has more selectivity during switching the attached target effect.

In this embodiment, an apparatus for effect generation is further provided. The apparatus is configured to implement the above embodiments and preferred implementations, and details that have been described are not repeated. As used below, the term "module" may implement combination of software and/or hardware with preset functions. Apparatuses described in the following embodiments are preferably implemented by the software, but it is possible and conceivable for implementing the apparatuses through the hardware or combination of the software and the hardware.

Figure 5:
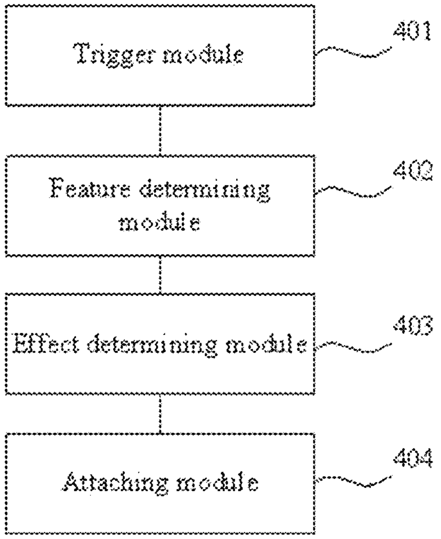
FIG. 5 is a structural block diagram of an apparatus for effect generation according to an embodiment of the present disclosure.

This embodiment provides an apparatus for effect generation, as shown in FIG. 5, including:

- a trigger module 401, configured to obtain, in response to a trigger operation of a current target object for an effect, at least one feature data corresponding to the current target object based on the trigger operation;
- a feature determining module 402, configured to determine a target feature data of the current target object based on the at least one feature data;
- an effect determining module 403, configured to determine a target effect corresponding to the target feature data based on a matching relationship between the target feature data and effects; and
- an attaching module 404, configured to attach the target effect on a preset part of the target object according to a preset manner.

In some optional implementations, the feature determining module 402 may include:

- a weight obtaining unit, configured to obtain a weight corresponding to each feature data; and
- a weighting unit, configured to determine target feature data by performing weighting process on the feature data based on the weight.

In some optional implementations, in response to there being a plurality of feature data, the effect determining module 403 may include:

- a parameter obtaining unit, configured to obtain a preset weight parameter corresponding to each of the effects;
- a weight parameter determining unit, configured to compare the target weight corresponding to target feature data with each preset weight parameter to determine a target weight parameter that matches the target weight; and
- a first effect determining unit, configured to determine a target effect corresponding to the target weight parameter.

In some optional implementations, the effect determining module 403 may include:

- a difference value determining unit, configured to determine a difference value between the target weight and each preset weight parameter in response to there being no target weight parameter matching the target weight; and
- a second effect determining unit, configured to determine the preset weight parameter having the smallest difference value with the target weight as a target weight parameter, and determine a target effect corresponding to the target weight parameter.

In some optional implementations, in response to there being one feature data, the effect determining module 403 may include:

- a trigger time obtaining unit, configured to obtain trigger time for the effect in response to the target feature data being the same;
- a third effect determining unit, configured to generate different target effects based on different trigger times; and
- a fourth effect determining unit, configured to determine a target effect corresponding to each target feature data based on the different target feature data in response to the target feature data being different.

In some optional implementations, in response to the feature data being illumination data, the effect determining module 403 is specifically configured to collect illumination data of a current spatial environment where the target object is located, where the different illumination data corresponds to different effects; and obtain a target effect corresponding to the illumination data according to a matching relationship between illumination data and effects.

In some optional implementations, in response to the feature data indicating texture features, the effect determining module 403 is specifically configured to collect an image of a clothing currently worn by the target object and analyze texture features of the clothing image; and obtain a target effect corresponding to the current texture features according to a matching relationship between texture features and effects.

In some optional implementations, in response to the feature data being object attribute data, the effect determining module 403 is specifically configured to collect an image of the target object, and analyze object attribute data of the target object; obtain effects of a plurality of styles corresponding to the object attribute data; and determine the effect of one style from the effects of the plurality of styles as a target effect tool.

In some optional implementations, the above effect generation apparatus may further include:

- a switching module, configured to switch, in response to a switching operation instruction of the target object for the target effect tool, the target effect tool based on the switching operation instruction;
- a posture obtaining module, configured to obtain a movement posture of the target object; and
- an adjustment module, configured to adjust a display form of the target effect based on the movement posture.

In some optional implementations, the above effect generation apparatus may further include:

- a tool set generation module, configured to generate an effect tool set.

Specifically, the tool set generation module may include:

- a display unit, configured to display a creation page for a model patch, which includes a plurality of model parameters;
- a parameter adjustment unit, configured to obtain a model parameter combination set in response to an adjustment operation on one or more model parameters;
- a model set generation unit, configured to perform programmable generation based on the model parameter combination set to obtain an effect model set; and
- a tool set generation unit, configured to generate an augmented virtual reality effect set based on the effect model set.

In some optional implementations, the tool set generation module may further include:

- an animation adding module, configured to add corresponding animation data to each effect in the effect set, and control a dynamic appearance method of the effect based on the animation data.

In some optional implementations, the tool set generation module may further include:

a material adjustment unit, configured to update material texture of the effect tool in response to a material adjustment instruction for the effect tool; and a storage unit, configured to store the effect with the updated material texture in the effect set.

Further functional descriptions of the various modules and units mentioned above are the same as the above corresponding embodiments, which are not repeated here.

The effect generation apparatus in this embodiment is presented in the form of a functional unit. The unit refers to an application specific integrated circuit (ASIC), a processor and a memory executing one or more software or fixed programs, and/or other devices that provide the above functions.

According to the effect generation apparatus provided by this embodiment, the different target objects correspond to the different target feature data. By detecting the target feature data of the current target object, the corresponding target effect is determined in conjunction with the matching relationship between the target feature data and the effects, and the target effect is attached on the preset part of the target object, thereby ensuring that the different target objects have different attached target effects, enriching the generation of the effects, diversifying the effects, and improving use experience of the effects.

The embodiments of the present disclosure further provide a computer device, having the effect generation apparatus shown in FIG. 5.

Figure 6:
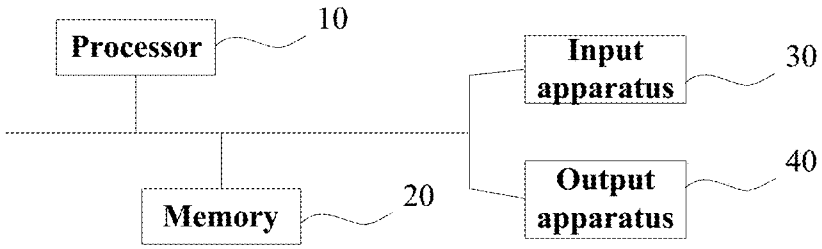
FIG. 6 is a schematic diagram of a hardware structure of a computer device according to an embodiment of the present disclosure.

Referring to FIG. 6, FIG. 6 is a structural schematic diagram of a computer device according to an optional embodiment of the present disclosure. As shown in FIG. 6, the computer device includes: one or more processors 10, a memory 20, as well as interfaces for connecting various components, including a high-speed interface and a low-speed interface. The various components are in mutual communication connection using different buses and may be installed on a common motherboard or installed in other methods as needed. The processor may process instructions executed within the computer device, including instructions stored in the memory or on the memory to display graphic information of a graphical user interface (GUI) on an external input/output apparatus (e.g., a display device coupled to the interface). In some optional implementations, a plurality of processors and/or a plurality of buses may be used together with a plurality of memories as needed. Similarly, a plurality of computer devices may be connected. Each device provides some necessary operations (e.g., as a server array, a set of blade servers, or a multiprocessor system). One processor 10 is used as an example in FIG. 6.

The processor 10 may be a central processing unit, a network processor, or a combination thereof. The processor 10 may further include a hardware chip. The hardware chip may be an application specific integrated circuit, a programmable logic device, or a combination thereof. The programmable logic device may be a complex programmable logic device, a field-programmable gate array, a generic array logic, or any combination thereof.

The memory 20 stores instructions executable by at least one processor 10, such that the at least one processor 10 performs the method shown in the above embodiments.

The memory 20 may include a program storage area and a data storage area. The program storage area may store an operating system and an application required by at least one function. The data storage area may store data created based on the use of the computer device. In addition, the memory 20 may include a high-speed random access memory, and may also include a non-transitory memory, such as at least one disk storage device, a flash memory device, or other non-transitory solid-state storage devices. In some optional implementations, the memory 20 optionally includes memories remotely set relative to the processor 10. These remote memories may be connected to the computer device through a network. The examples of the above network include, but are not limited to, an Internet, an intranet, a local area network, a mobile communication network, and a combination thereof.

The memory 20 may include a volatile memory, such as a random access memory. The memory may also include a non-volatile memory, such as a flash memory, a hard drive, or a solid-state drive. The memory 20 may further include combinations of the above types of memories.

The communication device further includes an input apparatus 30 and output apparatus 40. The processor 10, the memory 20, the input apparatus 30, and the output apparatus 40 may be connected through a bus or other methods, and bus connection is taken as an example in FIG. 6.

The input apparatus 30 may receive inputted digital or character information and generate key signal inputs relevant to user settings and function control of the computer device, such as a touch screen, a keypad, a mouse, a trackpad, a touchpad, an indicator rod, one or more mouse buttons, a trackball, a joystick, etc. The output apparatus 40 may include a display device, an auxiliary lighting apparatus (e.g., LED), and a tactile feedback apparatus (e.g., a vibration motor). The display device includes but is not limited to a liquid crystal display, a light emitting diode, a display, and a plasma display. In some optional implementations, the display device may be a touch screen.

The computer device further includes a communication interface, configured for communication between the computer device and other devices or communication networks.

The embodiments of the present disclosure further provide a computer-readable storage medium. The method according to the embodiments of the present disclosure may be implemented in hardware and firmware, or be implemented as computer code that is recordable on a storage medium, or is downloaded through the network and originally stored on a remote storage medium or a non-transitory machine-readable storage medium and then is stored on a local storage medium, and therefore the method described here may be processed by software that is stored on a storage medium using a general-purpose computer, a dedicated processor, or programmable or specialized hardware. The storage medium may be a magnetic disk, an optical disk, a read-only memory, a random access memory, a flash memory, a hard drive, a solid-state drive, or the like. Further, the storage medium may also include combinations of the above types of memories. It should be understood that a computer, a processor, a microprocessor controller, or programmable hardware includes a storage component that can store or receive software or computer code. When the software or computer code is accessed and executed by the computer, the processor, or the hardware, the method shown in the above embodiments is implemented.

Although the embodiments of the present disclosure are described in conjunction with the accompanying drawings, those skilled in the art may make various modifications and variations without departing from the spirit and scope of the present disclosure, and such modifications and variations fall within the scope defined by the appended claims.

The invention claimed is:

1. A method for effect generation, comprising:

obtaining, in response to a trigger operation of a current target object for an effect, at least one feature data corresponding to the current target object based on the trigger operation;

determining a target feature data of the current target object based on the at least one feature data;

determining a target effect corresponding to the target feature data based on a matching relationship between the target feature data and effects; and attaching the target effect on a preset part of the target object according to a preset manner, wherein each of the effects is stored in an effect set, and a generation method of the effect set comprises:

displaying a creation page for a model patch, wherein the creation page comprises a plurality of model parameters;

obtaining a model parameter combination set in response to an adjustment operation on one or more of the model parameters;

obtaining an effect model set by performing programmable generation based on the model parameter combination set; and generating the effect set of an augmented virtual reality based on the effect model set.

2. The method according to claim 1, wherein determining the target feature data of the current target object based on the at least one feature data comprises:

obtaining a weight corresponding to each of the feature data; and determining the target feature data by performing a weighting process on the feature data based on the weight.

3. The method according to claim 2, wherein in response to the feature data including a plurality of feature data, determining the target effect corresponding to the target feature data based on the matching relationship between the target feature data and effects comprises:

obtaining each of preset weight parameters corresponding to the effects;

determining a target weight parameter that matches a target weight corresponding to the target feature data by comparing the target weight with each of the preset weight parameters; and determining the target effect corresponding to the target weight parameter.

4. The method according to claim 3, wherein determining the target effect corresponding to the target feature data based on the matching relationship between the target feature data and effects comprises:

determining a difference value between the target weight and each of the preset weight parameters in response to there being no target weight parameter matching the target weight; and determining the preset weight parameter having the smallest difference value with the target weight as the target weight parameter; and determining the target effect corresponding to the target weight parameter.

5. The method according to claim 2, wherein in response to the feature data including one feature data, determining the target effect corresponding to the target feature data based on the matching relationship between the target feature data and effects comprises:

obtaining trigger times for the effect in response to the target feature data being the same; and generating different target effects based on different trigger times; or determining the target effect corresponding to each of target feature data based on the different target feature data in response to the target feature data being different.

6. The method according to claim 5, wherein the feature data is an illumination data, and determining the target effect corresponding to the target feature data based on the matching relationship between the target feature data and effects comprises:

collecting illumination data of a current spatial environment where the target object is located, wherein different illumination data correspond to different effects; and obtaining the target effect corresponding to the current illumination data according to a matching relationship between the illumination data and the effects.

7. The method according to claim 5, wherein the feature data is a texture feature, and determining the target effect corresponding to the target feature data based on the matching relationship between the target feature data and effects comprises:

collecting a clothing image of a clothing currently worn by the target object and analyzing texture features of the clothing image; and obtaining the target effect corresponding to the current texture feature according to a matching relationship between the texture features and the effects.

8. The method according to claim 5, wherein the feature data is an object attribute data, and determining the target effect corresponding to the target feature data based on the matching relationship between the target feature data and effects comprises:

collecting an image of the target object, and analyzing the object attribute data of the target object;

obtaining effects of a plurality of styles corresponding to the object attribute data; and determining the target effect to be an effect of one style from the effects of the plurality of styles.

9. The method according to claim 1, wherein after attaching the target effect on the preset part of the target object according to the preset manner, the method further comprises:

switching, in response to a switching operation instruction for the target effect, the target effect based on the switching operation instruction.

10. The method according to claim 1, wherein after attaching the target effect on the preset part of the target object according to the preset manner, the method further comprises:

obtaining a movement posture of the target object; and adjusting a display form of the target effect based on the movement posture.

11. The method according to claim 1, further comprising:

adding corresponding animation data to each effect in the effect set, and controlling a dynamic presenting manner of the effect based on the animation data.

12. The method according to claim 1, further comprising:

updating a material texture of the effect in response to a material adjustment instruction for the effect; and storing the effect with the updated material texture in the effect set.

13. A computer device, comprising:

a memory and a processor, wherein the memory and the processor are in mutual communication connection, the memory stores computer instructions, and the processor executes the computer instructions to:

obtain, in response to a trigger operation of a current target object for an effect, at least one feature data corresponding to the current target object based on the trigger operation;

determine a target feature data of the current target object based on the at least one feature data;

determine a target effect corresponding to the target feature data based on a matching relationship between the target feature data and effects; and attach the target effect on a preset part of the target object according to a preset manner, wherein each of the effects is stored in an effect set, and the processor executes the computer instructions to generate the effect set by:

displaying a creation page for a model patch, wherein the creation page comprises a plurality of model parameters;

obtaining a model parameter combination set in response to an adjustment operation on one or more of the model parameters;

obtaining an effect model set by performing programmable generation based on the model parameter combination set; and generating the effect set of an augmented virtual reality based on the effect model set.

14. The computer device according to claim 13, wherein the processor to determine the target feature data of the current target object based on the at least one feature data further executes the computer instructions to:

obtain a weight corresponding to each of the feature data; and determine the target feature data by performing a weighting process on the feature data based on the weight.

15. The computer device according to claim 14, wherein in response to the feature data including a plurality of feature data, the processor to determine the target effect corresponding to the target feature data based on the matching relationship between the target feature data and effects further executes the computer instructions to:

obtain each of preset weight parameters corresponding to the effects;

determine a target weight parameter that matches a target weight corresponding to the target feature data by comparing the target weight with each of the preset weight parameters; and determine the target effect corresponding to the target weight parameter.

16. The computer device according to claim 15, wherein the processor to determine the target effect corresponding to the target feature data based on the matching relationship between the target feature data and effects further executes the computer instructions to:

determine a difference value between the target weight and each of the preset weight parameters in response to there being no target weight parameter matching the target weight; and determine the preset weight parameter having the smallest difference value with the target weight as the target weight parameter; and determining the target effect corresponding to the target weight parameter.

17. The computer device according to claim 14, wherein in response to the feature data including one feature data, the processor to determine the target effect corresponding to the target feature data based on the matching relationship between the target feature data and effects further executes the computer instructions to:

obtain trigger times for the effect in response to the target feature data being the same; and generate different target effects based on different trigger times; or determine the target effect corresponding to each of target feature data based on the different target feature data in response to the target feature data being different.

18. The computer device according to claim 17, wherein the feature data is an illumination data, and the processor to determine the target effect corresponding to the target feature data based on the matching relationship between the target feature data and effects further executes the computer instructions to:

collect illumination data of a current spatial environment where the target object is located, wherein different illumination data correspond to different effects; and obtain the target effect corresponding to the current illumination data according to a matching relationship between the illumination data and the effects.

19. A non-transitory computer-readable storage medium, wherein the computer-readable storage medium stores computer instructions, and the computer instructions are configured to enable a computer to:

obtain, in response to a trigger operation of a current target object for an effect, at least one feature data corresponding to the current target object based on the trigger operation;

determine a target feature data of the current target object based on the at least one feature data;

determine a target effect corresponding to the target feature data based on a matching relationship between the target feature data and effects; and attach the target effect on a preset part of the target object according to a preset manner, wherein each of the effects is stored in an effect set, and the computer instructions are configured to enable a computer to generate the effect set by:

displaying a creation page for a model patch, wherein the creation page comprises a plurality of model parameters;

obtaining a model parameter combination set in response to an adjustment operation on one or more of the model parameters;

obtaining an effect model set by performing programmable generation based on the model parameter combination set; and generating the effect set of an augmented virtual reality based on the effect model set.

* * * * *